Dec. 6, 1955
A. HOPKINS
2,725,776
LATHE ATTACHMENTS
Filed May 24, 1949
2 Sheets-Sheet 2
Fig 3
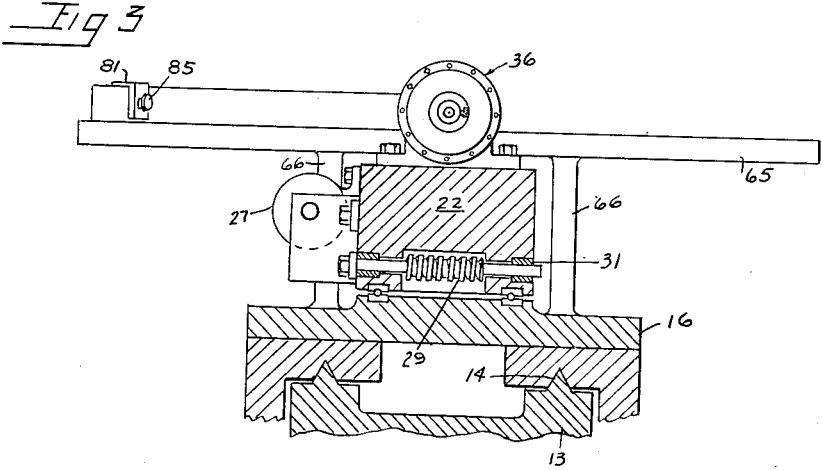
Fig 4
Fig 5
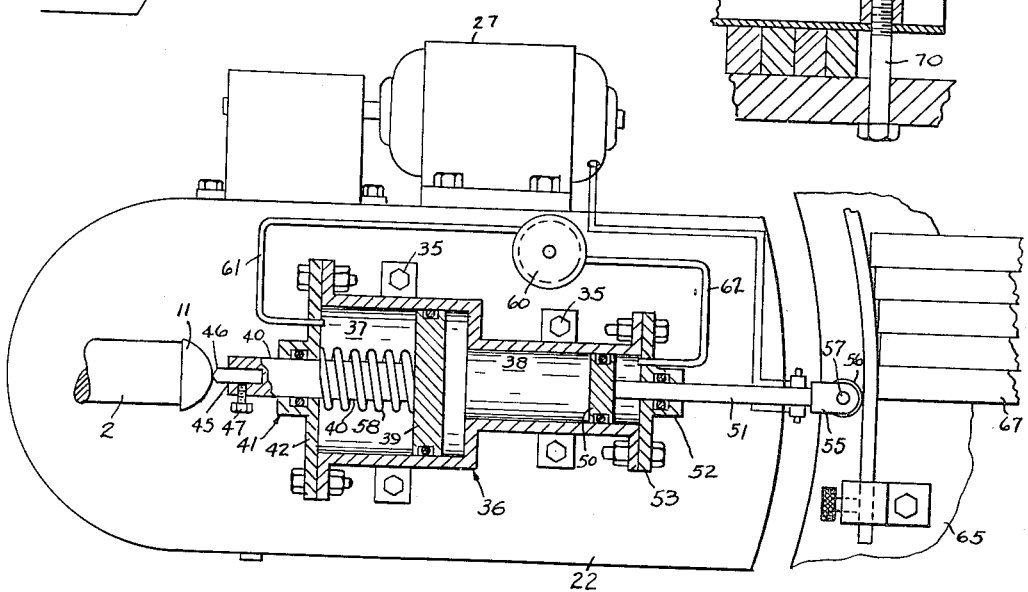
Fig 6
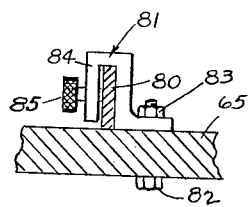
INVENTOR.
ALAN HOPKINS
BY
Boyken, Mohler + Beckley
ATTORNEYS

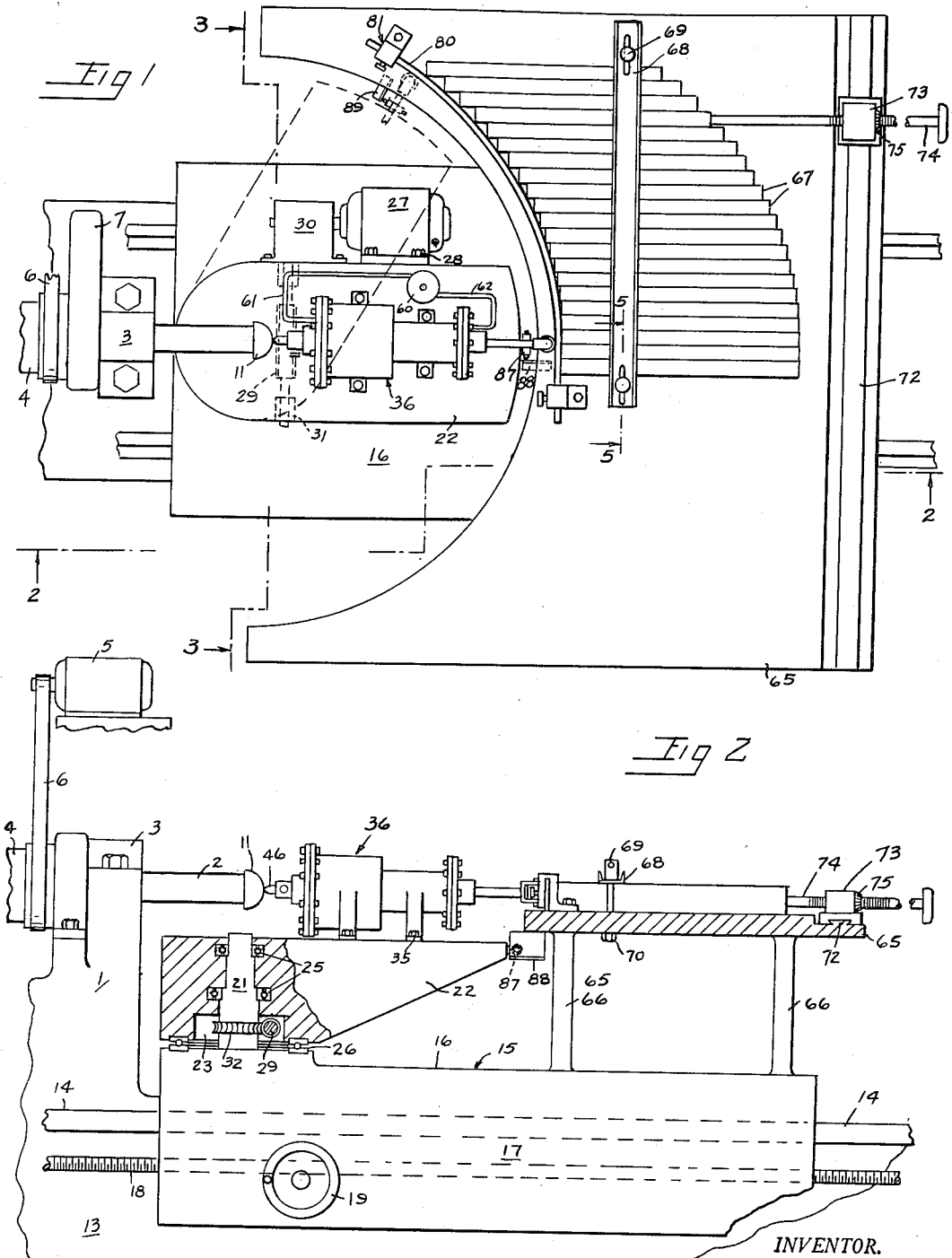

2,725,776

LATHE ATTACHMENTS

Alan Hopkins, Los Angeles, Calif.

Application May 24, 1949, Serial No. 95,044

6 Claims. (Cl. 82—14)

This invention relates to automatic cutting and polishing devices and more particularly to a device which is adapted to be used as a lathe attachment for cutting or polishing work on a rotating chuck.

Most lathes are adapted to finish work to a cylindrical shape and attachments for making tapers to effect a conical surface are quite common place. However, the conventional lathe is not adapted to cut spherical surfaces nor is it adapted to cut the more complicated surfaces such as are generated by parabolas, hyperbolas or by curves which are not subject to exact mathematical definition.

When precision is required in cutting surfaces of generation such as in lens cutting, it is important that a means be provided for reproducing a predetermined surface which is known to provide the desired optical characteristics.

The structure herein disclosed will be described in connection with lens cutting because of the accuracy involved in such work, but it will be obvious that it may be used to produce other surfaces of generation.

One of the objects of this invention is the provision of a cutting attachment which is readily adapted to be used with a conventional lathe and which has the inherent accuracy required for high precision work.

Another object of the invention is the provision of a cutting attachment which may be employed to produce unique surfaces of generation with great accuracy and speed.

Still another object of the invention is the provision of device for accurately producing surfaces of generation by reproducing to a greatly reduced scale a predetermined curve and cutting a rotating article along such a curve, thereby generating a surface of revolution.

Other objects and advantages will be obvious from the drawings and specifications.

Fig. 1 is a top plan view of the central portion of a conventional lathe with the invention attached thereto.

Fig. 2 is a front side elevational view of the structure shown in Fig. 1.

Fig. 3 is a cross sectional view of the device as taken along the lines 3—3 of Fig. 1.

Fig. 4 is an enlarged plan view partly in section of a portion of the device.

Fig. 5 is a cross-section view through the table as taken along lines 5—5 of Fig. 1.

Fig. 6 is a cross-sectional view through the table showing a portion of the invention.

For purposes of illustration the invention is shown in conjunction with a conventional lathe having a head stock 1 carrying a spindle 2 journalled in a bearing 3 and which spindle is driven by a spindle cone 4. The spindle cone 4 is in turn driven by an electric motor 5 through a belt 6. Back gears (not shown) are positioned within a guard 7 and serve to rotate the spindle at a relatively lower rate of speed than that of the spindle cone.

The work 11 is secured to the spindle 2 by lacquer in the usual manner or by any other suitable means.

Supporting the headstock 1 is the lathebed 13 having thereon carriage ways 14 extending longitudinally of the lathebed 13 and adapted to support a carriage 15 for adjustable movement along said carriage ways. In the drawings the carriage 15 is shown somewhat more elongated longitudinally of the lathe than a conventional carriage but it has the usual function of permitting the cutting tool to be moved towards and away from the work as desired.

The carriage 15 comprises the usual saddle 16 extending transversely of the carriage ways 14 and adapted to reciprocate thereon. An apron 17 is secured at right angles to and extending downwardly from the saddle 16 and is provided with the usual gearing (not shown) for reciprocation of the carriage 15 when driven by lead screw 18 or when actuated manually by means of apron hand wheel 19. Such a carriage and associated apron mechanism is old and no claim is made thereto except in combination with the invention herein disclosed.

A center post 21 extending upwardly from the saddle 16 is rigidly secured perpendicular to said saddle centrally of the carriage ways 14 and adjacent that end of the carriage 15 which is nearer the headstock 1. A sweep block casting 22 is mounted on the center post 21 for rotation about the vertical axis of said center post. Bearings 25 are provided on center post 21 and bearing 26 is provided on saddle 16 to facilitate rotation of sweep block casting 22 around center post 21.

An electric reversing motor 27 is mounted on sweep block casting 22 by means of bolts 28 and drives worm shaft 29 through reducer 30 at right angles to the shaft of motor 27. The worm shaft is thus disposed laterally of the sweep block casting and is rotatably mounted in bearings 31. The worm shaft 29 coacts with worm gear 32 which in turn is secured to center post 21. The sweep block casting 22 is recessed as at 23 to receive the worm 29 and worm gear 32 (Fig. 2).

Thus it is seen that rotation of the electric reversing motor 27 will rotate the sweep block casting 22 around the center post 21.

Mounted on sweep block casting 22 by means of bolts 35 is a hydraulic housing 36 having its axis disposed longitudinally of sweep block casting 22 and at right angles to the axis of center post 21. The hydraulic housing 36 comprises two communicating cylinders 37 and 38. One cylinder 37 which is nearest the headstock 1 has a greater diameter than cylinder 38 for a purpose to be described later in detail. Piston 39 is disposed within cylinder 37 in sliding contact with the inner walls of the same. Piston rod 40 is rigidly secured centrally of piston 39 and slidably engages stuffing box 41 in end wall 42 of the hydraulic housing 36.

The piston rod 40 may be provided with a longitudinal hole 45 which serves to carry cutting tool 46 which tool may be rigidly but releasably secured to the piston rod 40 by means of set screw 47.

Disposed within cylinder 38 is piston 50 adapted to reciprocate within the cylinder 38 in the same manner as piston 39 reciprocates within cylinder 37.

Piston rod 51 is rigidly secured to piston 50 centrally of the same and is adapted to slidably engage stuffing box 52 in end wall 53 of hydraulic housing 36. The free end of piston rod 51 is provided with a clevis 55 which carries a roller 56 rotatably secured to clevis pin 57.

Disposed within cylinder 37 and yieldably urging piston 39 away from work 11 is helical spring 58 for which spring, piston rod 40 serves as a retainer. Constant pressure is maintained at all times on the piston rod ends of cylinders 37, 38 by means of surge tank 60. This tank, which is open to the atmosphere, communicates with cylinders 37, 38 by means of conduits 61, 62 respectively.

A table 65 is positioned over the carriage 15 on the side of the sweep block casting opposite the headstock 1 and is rigidly secured to carriage 15 by means of legs 66. The table 65 is adapted to support a plurality of elongated gage blocks 67 which are preferably bars of steel of rectangular cross-section and accurately machined to identical lengths. The gage blocks 67 are frictionally secured to the table 65 by means of crossbar 68 which is positioned transversely of the gage blocks 67 and forced downwardly upon the gage blocks 67 by means of handscrews 69. The handscrews 69 are threadedly secured to bolt 70 and both table 65 and crossbar 68 are apertured to receive the shank of said bolt. The gage blocks 67 may be secured to the table 65 magnetically if desired.

Disposed transversely of the table 65 on the side remote from the sweep block casting 22 is a dovetail ways 72 on which is supported an indicator carriage 73 reciprocable on said ways. An elongated indicator 74 is supported within said carriage and is adapted to be adjustably moved transversely of said ways into contact with the ends of the gage blocks 67. The carriage 73 may be provided with a micrometer attachment 75 and the indicator with appropriate markings so that adjustment of the indicator along its length may be made with precision.

Thus it is seen that the gage blocks 67 may be arranged along the table 65 offset with respect to each other in order to duplicate any desired curve. It is understood, of course, that once having a curve plotted on a chart the same curve may be reproduced by letting increments transversely of the table 65 equal abscissa increments of the curve and letting the amount which the gage blocks are offset with respect to each other equal the increments along the ordinates of such a curve.

To provide a surface corresponding to the plotted curve which the roller 56 may contact, a spline or template 80 is positioned along the ends of the gage blocks 67 nearer the sweep block casting 22. This template 80 must contact the vertical edge of each gage block which is closest to the spline so that the curve defined by the template 80 is identical to the plotted curve. To insure contact between the template 80 and the gage blocks 67, it has been found that a spline having a thickness no greater than ⅛ inch will readily conform to the curve defined by the ends of the gage block 67 when a slight amount of compression is produced in the template 80 by exerting opposed forces on the ends of the spline.

For the purpose of thus holding the template 80 against the gage blocks 67 a clamp 81 is provided at each end of the template 80. This clamp 81 is secured to the table 65 by means of bolt 82 and nut 83 and comprises a downwardly opening channel member 84 for receiving the template 80. Bolt 82 is secured through one leg of the channel member and serves to clamp the template in any desired position (Fig. 6).

In operation, the work is mounted in the work holder secured to headstock spindle 2 and the predetermined curve which is to be generated to form the surface desired is set up by means of gage blocks 67. The spline 80 is then brought in contact with the gage blocks 67 by means of clamps 81 and the carriage 15 moved towards the work by turning apron handwheel 19. When the cutting tool 46 is in position for the first cut the spindle 2 and motor 27 may be started. The spring 58 will urge the roller 56 against the template 80 and the curve to which said spline is bent will be reproduced on the work but to a smaller scale. The radial distance moved by the roller 56 will bear the same proportion to the radial distance moved by the cutting tool as the area of large piston 39 bears to the area of small piston 50. Thus it is obvious that if the sweep block casting 22 is moved to a position longitudinally of the carriage ways 14 and the gage blocks 67 arranged so that the ratio of the working radius of the roller 56 to the working radius of the cutter 46 is identical to the ratio of the areas of the pistons 39 and 50 then the curve traced by the cutting tool 46 will be identical to the curve traced by the roller 56 but will be reduced in the above ratio. The proportional curve tracing as above explained is made possible because the roller piston rod 51 is coaxial with the cutting tool piston rod 40 and the angular movement of the cutting tool 46 is equal to the angular movement of the roller 56.

It should be noted that the template 80 may be made to conform to a curve of which the abscissae and ordinates are plotted to different scales. In this case the areas of the pistons need not necessarily bear the ratio above mentioned but in any event the curve of the template and the ratio of the areas of the pistons should be predetermined so that the desired contour is given to the article to be formed.

A reversing switch 87 may be secured on the side of the sweep block casting remote from the center post 21. This switch 87 may be adapted to be actuated by stops 88, 89 positioned on the carriage approximately at the ends of the curve defined by spline 80. Thus the motor 27 may be reversed at each end of the curve to produce an oscillating motion of the sweep block casting 22. The stop 89 which is remote from the center of the ways 14 may also be adapted to mechanically actuate a linkage for the purpose of feeding the carriage 15 by increments towards the work 11. However, manual control by handwheel 19 is preferable when inspection of the surface of the work is desired.

In view of the above description it is apparent that the present invention provides an accurate device for forming an article to a non-circular contour and which device may be readily incorporated in a lathe.

The above description and drawings are not to be construed as restrictive of the invention but are merely a preferred embodiment thereof.

For example, the table 65 and the gauge blocks 67 positioned thereon are shown on the drawings merely as one method which may be employed for setting up the curve from which the surface of the work is to be produced. It is obvious that other means may be used to establish the curve which is shown on the drawings as defined by template 80 so long as such means permit movement of the curve towards and away from the work.

In the claims, the term non-circular contour is employed to denote all curves which deviate from circular including straight lines. It is obvious of course that the machine herein described may be readily employed to produce circular surfaces if desired.

I claim:

1. In combination with a lathe having a revolvable spindle for supporting an article to be formed and a carriage for adjustable movement in a direction longitudinally of the axis of said spindle, a base on said carriage supported for oscillatory movement transversely of said axis, a template of predetermined contour on said carriage, a housing on said base, a first piston rod slidably mounted in said housing for supporting a cutting tool in cutting engagement with said article, a second piston rod slidably mounted in said housing for supporting a follower for engagement with said template along said contour during said oscillation, first and second pistons slidably supported in said housing and secured to said first and second piston rods respectively, said second piston having a larger area than said first piston, a pressure transmitting fluid in said housing extending between said pistons, whereby movement of said second piston rod imparts a movement of a lesser amount to said first piston rod in the same direction.

2. In combination with a lathe having a revolvable spindle for supporting an article to be formed and a carriage for adjustable movement in a direction longitudinally of the axis of said spindle, a base on said carriage supported for oscillatory movement transversely of said axis, a template of predetermined contour on said carriage, a housing on said base, a first piston rod slidably mounted in said housing for supporting a cutting tool in cutting engagement with said article, a second piston rod slidably mounted in said housing for supporting a follower for engagement with said template along said contour during said oscillation, first and second pistons slidably supported in said housing and secured to said first and second piston rods respectively, said second piston having a larger area than said first piston, a pressure transmitting fluid in said housing extending between said pistons, whereby movement of said second piston rod imparts a movement of a lesser amount to said first piston rod in the same direction, and means in said housing for yieldably urging said cutting tool toward said follower at all times.

3. A device for forming the surface of an article to a predetermined non-circular contour comprising, a support for such article for supporting the latter for rotation about an axis, a template of predetermined contour, a surface forming tool, a base supported for oscillatory movement about an axis perpendicular to said axis, a housing on said base, a first cylinder in said housing adjacent said article, a second cylinder in said housing adjacent said template and communicating with said first cylinder, pistons in said cylinders, a piston rod secured to the piston in said first cylinder for supporting said forming tool in cutting engagement with said article, a piston rod secured to the piston in said second cylinder for supporting a follower for engagement with said template along said contour during said oscillation said first and second cylinders and their associated pistons being of correspondingly different areas, a pressure transmitting fluid in said housing for converting movement of one of said pistons into movement of a different degree of the other of said pistons.

4. A device for forming the surface of an article to a predetermined non-circular contour comprising, a support for such article for supporting the latter for rotation about an axis, a template of predetermined contour, a surface forming tool, a base supported for oscillatory movement about an axis perpendicular to said axis, a housing on said base, a first cylinder in said housing adjacent said article, a second cylinder in said housing adjacent said template and communicating with said first cylinder, pistons in said cylinders, a piston rod secured to the piston in said first cylinder for supporting said forming tool in cutting engagement with said article, a piston rod secured to the piston in said second cylinder for supporting a follower for engagement with said template along said contour during said oscillation, a pressure transmitting fluid in said housing for converting movement of one of said pistons into movement of the other of said pistons, the ratio of the area of said first cylinder to the area of said second cylinder being substantially equal to the ratio of the respective distances of said template and the forming edge of said tool from said axis of oscillation.

5. A device for forming the surface of an article to a predetermined non-circular contour comprising, a support for such article for supporting the latter for rotation about an axis, a template of predetermined contour, a surface forming tool, a base supported for oscillatory movement about an axis perpendicular to said axis, a housing on said base, a first cylinder in said housing adjacent said article, a second cylinder in said housing adjacent said template and communicating with said first cylinder, pistons in said cylinders, a piston rod secured to the piston in said first cylinder for supporting said forming tool in cutting engagement with said article, a piston rod secured to the piston in said second cylinder for supporting a follower for engagement with said template along said contour during said oscillation, a pressure transmitting fluid in said housing for converting movement of one of said pistons into movement of the other of said pistons, and spring means in said first cylinder for urging said cutting tool away from said article at all times.

6. A device for forming the surface of an article to a predetermined non-circular contour comprising, a support for such article for supporting the latter for rotation about an axis, a template of predetermined contour, a surface forming tool, a base supported for oscillatory movement about an axis perpendicular to said axis, a housing on said base, a first cylinder in said housing adjacent said article, a second cylinder in said housing adjacent said template and communicating with said first cylinder, pistons in said cylinders, a piston rod secured to the piston in said first cylinder for supporting said forming tool in cutting engagement with said article, a piston rod secured to the piston in said second cylinder for supporting a follower for engagement with said template along said contour during said oscillation, a pressure transmitting fluid in said housing for converting movement of one of said pistons into movement of the other of said pistons, motor means on said base for swinging said base about said axis of oscillation and reversing means on said base for reversing the direction of said base at predetermined points.

References Cited in the file of this patent

UNITED STATES PATENTS

| | | |
|---|---|---|
| 320,179 | Schulze-Berge | June 16, 1885 |
| 606,676 | Mink | July 5, 1898 |
| 1,078,879 | Roy | Nov. 18, 1913 |
| 1,234,527 | Berriman | July 24, 1917 |
| 2,056,149 | Griffing | Sept. 29, 1936 |
| 2,168,633 | Smith | Aug. 8, 1939 |
| 2,323,528 | Faulhaber | July 6, 1943 |
| 2,355,812 | Martindell | Aug. 15, 1944 |
| 2,379,419 | Atti | July 3, 1945 |
| 2,418,786 | Nadig | Apr. 8, 1947 |
| 2,487,944 | Pressman | Nov. 15, 1949 |
| 2,559,138 | Waterson | July 3, 1951 |

FOREIGN PATENTS

| | | |
|---|---|---|
| 386,270 | Great Britain | Jan. 12, 1933 |